(12) United States Patent
Lee et al.

(10) Patent No.: US 10,178,317 B2
(45) Date of Patent: Jan. 8, 2019

(54) IMAGING DEVICE MODULE WITH IMAGE STABILIZATION, USER TERMINAL APPARATUS INCLUDING THE IMAGING DEVICE MODULE, AND METHOD OF OPERATING THE IMAGING DEVICE MODULE

(71) Applicant: SAMSUNG ELECTRONICS CO., LTD., Suwon-si, Gyeonggi-do (KR)

(72) Inventors: Jin-won Lee, Seongnam-si (KR); Chong-sam Chung, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 17 days.

(21) Appl. No.: 15/271,514

(22) Filed: Sep. 21, 2016

(65) Prior Publication Data

US 2017/0187962 A1   Jun. 29, 2017

(30) Foreign Application Priority Data

Dec. 23, 2015 (KR) .................. 10-2015-0185096

(51) Int. Cl.
| | |
|---|---|
| *H04N 5/228* | (2006.01) |
| *H04N 5/232* | (2006.01) |
| *H04N 5/225* | (2006.01) |
| *G02B 27/64* | (2006.01) |
| *G03B 5/00* | (2006.01) |
| *G03B 17/17* | (2006.01) |

(52) U.S. Cl.
CPC ....... *H04N 5/23287* (2013.01); *G02B 27/646* (2013.01); *G03B 5/00* (2013.01); *G03B 17/17* (2013.01); *H04N 5/2254* (2013.01); *H04N 5/2258* (2013.01); *G03B 2205/0007* (2013.01)

(58) Field of Classification Search
CPC .............................................. G03B 2205/0015
See application file for complete search history.

(56) References Cited

U.S. PATENT DOCUMENTS

| | | | | |
|---|---|---|---|---|
| 7,375,905 | B2 * | 5/2008 | Jin ...................... | G02B 27/646 |
| | | | | 348/208.11 |
| 8,259,182 | B2 * | 9/2012 | Sato ........................ | G03B 5/00 |
| | | | | 348/208.11 |
| 8,654,447 | B2 * | 2/2014 | Morooka ............. | G02B 15/173 |
| | | | | 359/557 |
| 2004/0141065 | A1 * | 7/2004 | Hara .................... | H04N 5/2254 |
| | | | | 348/208.11 |
| 2010/0021150 | A1 * | 1/2010 | Maeda .................. | G03B 17/00 |
| | | | | 396/55 |
| 2015/0253543 | A1 | 9/2015 | Mercado | |
| 2015/0253647 | A1 | 9/2015 | Mercado | |

(Continued)

FOREIGN PATENT DOCUMENTS

| | | | |
|---|---|---|---|
| JP | 10020353 A | * | 1/1998 |
| KR | 10-1246578 | | 3/2013 |

*Primary Examiner* — Gary C Vieaux
(74) *Attorney, Agent, or Firm* — Nixon & Vanderhye, P.C.

(57) ABSTRACT

Provided is an imaging device module including: an imaging device including a first optical element on which a first light is incident and an image sensor; and a first optical image stabilization (OIS) operator configured to move back and forth along an optical axis direction of a second light reflected from the first optical system, wherein a third light having an optical path adjusted by the first OIS operator may be incident on the image sensor.

11 Claims, 12 Drawing Sheets

(56) References Cited

U.S. PATENT DOCUMENTS

| | | | |
|---|---|---|---|
| 2015/0256727 A1* | 9/2015 | Kim | G02B 7/09 |
| | | | 348/208.12 |
| 2015/0358545 A1* | 12/2015 | Wakamatsu | H04N 5/23219 |
| | | | 348/208.1 |
| 2016/0241787 A1* | 8/2016 | Sekimoto | H04N 5/2257 |

* cited by examiner

IMAGING DEVICE MODULE WITH IMAGE STABILIZATION, USER TERMINAL APPARATUS INCLUDING THE IMAGING DEVICE MODULE, AND METHOD OF OPERATING THE IMAGING DEVICE MODULE

CROSS-REFERENCE TO RELATED APPLICATION

This application is based on and claims priority under 35 U.S.C. § 119 to Korean Patent Application No. 10-2015-0185096, filed on Dec. 23, 2015, in the Korean Intellectual Property Office, the disclosure of which is incorporated by reference herein in its entirety.

BACKGROUND

1. Field

The present disclosure relates to an imaging device module for capturing an image, a user terminal apparatus including the imaging device module, and a method of operating the imaging device module.

2. Description of Related Art

Terminals may be classified into mobile/portable terminals and stationary terminals based on mobility. Here, as functions are diversified, the mobile/portable terminals are realized as multimedia players having complex functions, such as reproduction of music or video files, games, and reception of broadcasts.

Such a mobile/portable terminal may include a display that displays an image, and an imaging device module. Recently, according to a slimness trend of the mobile/portable terminal, thickness of the mobile/portable terminal is decreasing, and when an imaging device is modularized and mounted in the mobile/portable terminal, a height of the imaging device module is also reduced to match the thickness of the mobile/portable terminal, and thus it may be difficult to mount the imaging device module having a wide view angle for various functions, such as a zooming function and telephoto function, on the mobile/portable terminal.

Accordingly, an imaging device module having a low height while including various functions, a user terminal apparatus, and a method of operating the imaging device module need to be provided.

SUMMARY

According to an aspect of an example embodiment, an imaging device module includes: an imaging device including a first optical system on which a first light is incident and an image sensor; and a first optical image stabilization (OIS) operator configured to move back and forth along a first direction, wherein the first direction is an optical axis direction of a second light reflected from the first optical system, wherein a third light having an optical path adjusted by the first OIS operator may be incident on the image sensor.

The imaging device module may further include: a 1-1st sensor configured to measure moving displacement of the imaging device with respect to the first direction; a first OIS driver configured to move the first OIS operator along the first direction; and a 2-1st sensor configured to measure moving displacement of the first OIS operator.

The imaging device module may further include a second OIS operator configured to move back and forth along a third direction perpendicular to the first direction and a second direction, wherein the second direction is an optical axis direction of the first light.

The imaging device module may further include: a 1-2nd sensor configured to measure moving displacement of the imaging device in the third direction; and a 2-2nd sensor configured to measure moving displacement of the second OIS operator.

The imaging device may further include: an auto-focus (AF) operator movable back and forth along the first direction; and an AF driver configured to move the AF operator along the first direction.

The imaging device module may further include a controller configured to control the first and second OIS drivers and the AF driver.

At least one of the first optical system and the first OIS driver may include at least one reflection surface from which the first light or the second light is reflected.

According to an aspect of another example embodiment, an imaging device module includes: an imaging device including an image sensor and a lens module movable with respect to the image sensor; and a driving module configured to generate driving power for moving the lens module, wherein the driving module may include: an auto-focus (AF) driver configured to generate driving power for moving the lens module along a first direction, wherein the first direction is an optical axis direction of second light; and a first optical image stabilization (OIS) driver configured to generate driving power for moving the lens module along a second direction, wherein the second direction is an optical axis direction of first light. The imaging device module may further include a second OIS driver configured to generate driving power for moving the lens module along a third direction, wherein the third direction is a direction perpendicular to the first direction and the second direction.

The lens module may include: a first optical system on which the first light is incident; and an AF operator configured to adjust a focus of the second light reflected from the first optical system.

The imaging device module may further include a controller configured to control the driving module.

The imaging device module may further include: a 1-1st sensor configured to measure moving displacement of the imaging device in the first direction; a 1-2nd sensor configured to measure moving displacement of the imaging device in the third direction; a 2-1st sensor configured to measure moving displacement of the lens module in the second direction; and a 2-2nd sensor configured to measure moving displacement of the lens module in the third direction.

The first optical system may be a reflective optical system including at least one reflection surface from which the first light is reflected.

According to an aspect of another embodiment, a user terminal apparatus includes the imaging device module.

According to an aspect of another embodiment, a method of operating the imaging device module, the method includes: measuring moving displacement of the imaging device in the first direction according to hand tremble; and moving the first OIS operator back and forth along the first direction according to the measured moving displacement of the imaging device in the first direction.

The method may further include moving an auto-focus (AF) operator back and forth along the first direction.

Moving displacement of the AF operator may be determined by adding the moving displacements of the first OIS operator in the first direction.

The method may further include: measuring moving displacement of the imaging device in the third direction according to hand tremble; and moving the second OIS operator back and forth along the third direction according to the measured moving displacement of the imaging device in the third direction.

According to an aspect of another example embodiment, a method of operating the imaging device module, the method includes: measuring moving displacement of the imaging device in the first direction and the third direction according to hand tremble; and moving the lens module back and forth along the second direction and the third direction according to the measured moving displacement of the imaging device.

The method may further include moving the lens module back and forth along the first direction based on a distance between a subject and the lens module.

Moving displacement of the lens module in the first direction may be determined based on: moving displacement of the lens module in the second direction for hand trembling compensation; and a distance between the subject and the lens module before the hand trembling compensation.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Reference will now be made in greater detail to various example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected, and in this case, the meaning of the selected terms will be described in the description. Thus, the terms used herein have to be defined based on the meaning of the terms together with the description throughout the description.

In the drawings, the thicknesses of layers and regions may be exaggerated for clarity, and like reference numerals in the drawings denote like elements.

As used herein, the singular forms "a," "an" and "the" are intended to include the plural forms as well, unless the context clearly indicates otherwise.

In the following description, terms such as "unit" and "module" indicate a unit for processing at least one function or operation, wherein the unit and the block may be embodied as hardware or software or embodied by combining hardware and software.

Figure 1:
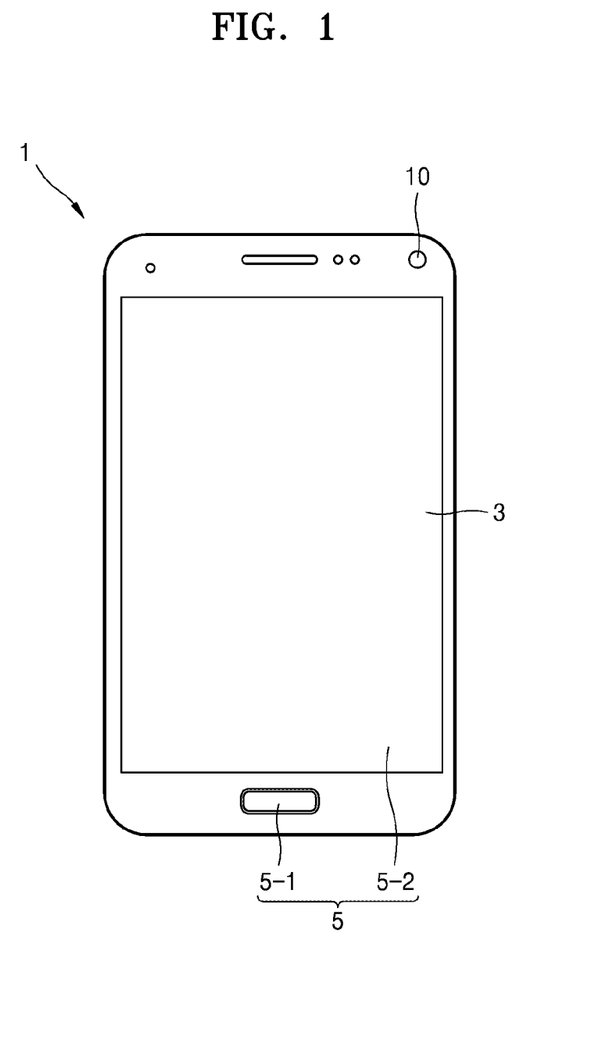
FIG. 1 is a diagram illustrating an example user terminal apparatus according to an example embodiment.

FIG. 1 is a front view of a user terminal apparatus 1 according to an example embodiment. The user terminal apparatus 1 according to an example embodiment may be, for example, a wearable device, such as a mobile phone, a tablet personal computer (PC), a PC, a smart television (TV), a personal digital assistant (PDA), a laptop, a media player, an MP3 player, a micro-server, a global positioning system (GPS) apparatus, an electronic book terminal, a digital broadcasting terminal, a kiosk, an electronic frame, a navigation device, a digital TV, a write watch, or a head-mounted display (HMD), or a mobile or non-mobile computing apparatus, but is not limited thereto.

Referring to FIG. 1, the user terminal apparatus 1 may include a display 3, an input/output (I/O) module 5, and an imaging device module 10.

The display 3 may include a display panel and a controller (not shown) controlling the display panel. The display panel may be any one of various types, such as a liquid crystal display (LCD) panel, an organic light-emitting diode (OLED) display panel, an active matrix-OLED (AM-OLED) display panel, and a plasma display panel (PDP).

The I/O module 5 may refer, for example, to an apparatus that receives an input signal from an external device and externally transmits an output signal, and may include, for example, at least one of at least one button 5-1 and a touch panel 5-2.

The imaging device module 10 may refer, for example, to an imaging unit that is capable of capturing a still image or a video. For example, there may be a plurality of the imaging device modules 10, wherein one imaging device module 10 may be provided on a front surface of the user terminal apparatus 1 and another imaging device module 10 may be provided on a rear surface of the user terminal apparatus 1. Also, the plurality of imaging device modules 10 may be adjacently arranged (for example, an interval thereof may be larger than 1 cm and smaller than 8 cm) to capture a 3-dimensional (3D) still image or a 3D video. Also, the imaging device module 10 may include an auxiliary light source (not shown) providing quantity of light required to capture a still image or a video. A structure of the imaging device module 10 will now be described with reference to FIGS. 2 through 4.

Figure 2:
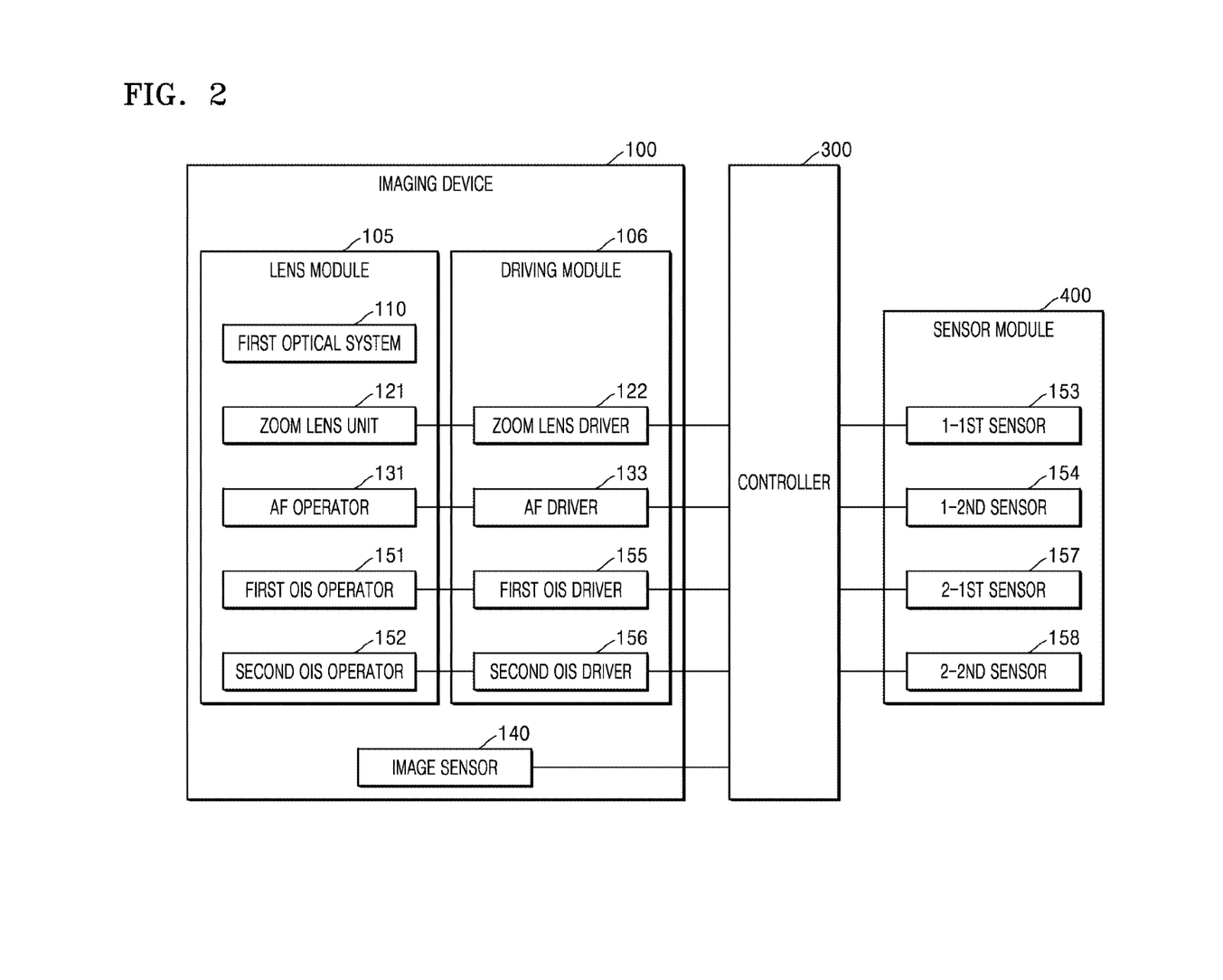
FIG. 2 is a block diagram illustrating an example structure of an imaging device module, according to an example embodiment.
Figure 3:
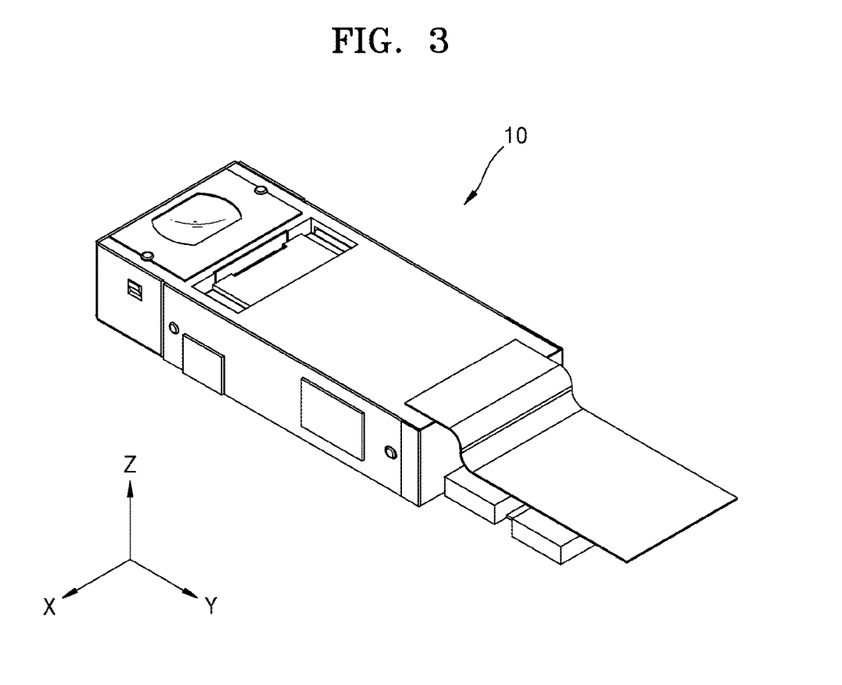
FIG. 3 is a perspective view of an example imaging device module according to an example embodiment.
Figure 4:
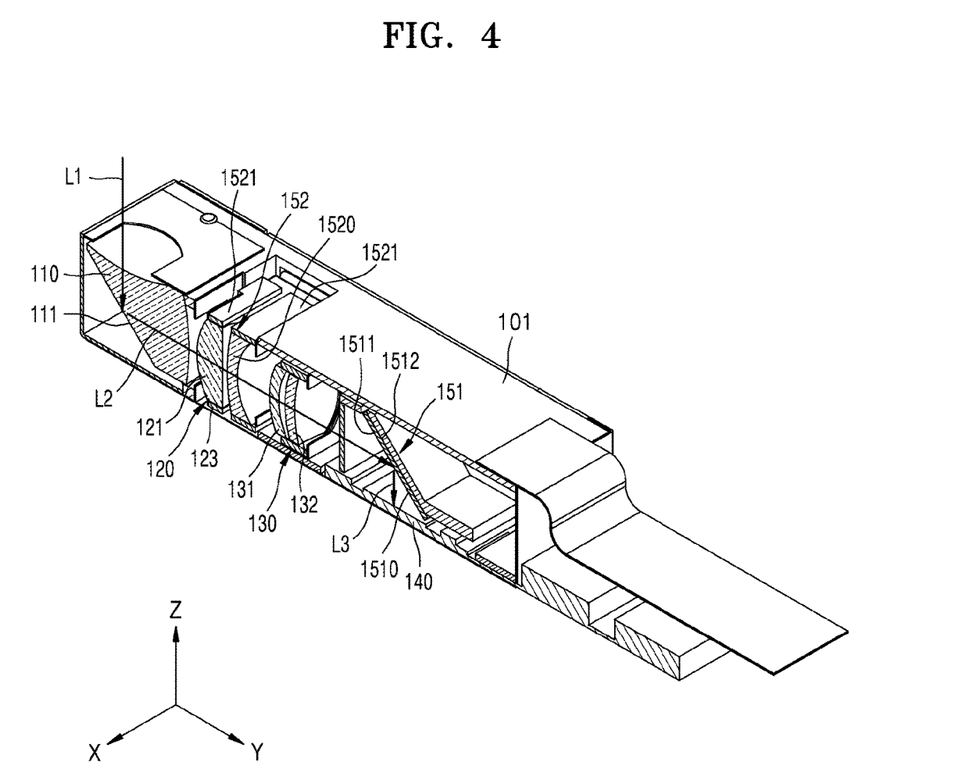
FIG. 4 is a cross-sectional view of an example imaging device module according to an example embodiment.

FIG. 2 is a block diagram illustrating an example structure of the imaging device module 10, according to an example embodiment. FIG. 3 is a perspective view of the imaging device module 10 according to an example embodiment. FIG. 4 is a cross-sectional view of the imaging device module 10 according to an example embodiment.

Referring to FIGS. 2 through 4, the imaging device module 10 according to an example embodiment may include an imaging device 100 for capturing a still image or a video, a controller 300 configured to control operations of the imaging device module 10, and a sensor module 400.

The imaging device 100 according to an example embodiment may include a lens module 105 including a plurality of lens units on which incident light is incident, a driving module 106 for driving each of the plurality of lens units included in the lens module 105, and an image sensor 140. For example, the lens module 105 according to an example embodiment may include a first optical system 110, a zoom lens unit 121, an auto-focus (AF) operator 131, a first hand tremble compensating operator, e.g. an optical image stabilizer (OIS) type operator 151, and a second hand tremble compensating operator, e.g., an OIS type operator 152.

The first optical system 110 may be an optical system capable of changing an optical path of first light L1 incident from an external source. For example, when the first optical system 110 is a reflective optical system, the first optical system 110 may have a folded optics structure in which a proceeding path of the first light L1 is changed to that of second light L2. According to such a folded optics structure, a height of the imaging device 100 (a length of the first light L1 in an optical axis direction (second direction) Z) may be largely reduced regardless of a focal length of the imaging device 100 by lengthily extending the optical path by using at least one reflection surface 111. However, an embodiment is not limited thereto, and the first optical system 110 according to an embodiment may be an optical system that does not change the optical path of the first light L1 incident from the external source. In this case, the imaging device module 10 may have a stacked optical structure.

The zoom lens unit 121 may be disposed in a lens tube 101 while being fixed to a zoom lens frame 123, and a relative location of the zoom lens unit 121 with respect to another optical system may change as the zoom lens unit 121 is moved along an optical axis direction (first direction) Y of the second light L2 by a zoom lens driver 122 included in the driving module 106. Accordingly, a zoom lens module 120 may perform a zooming function or a telephoto function.

The AF operator 131 may be provided in the lens tube 101 while being fixed to an AF frame 132. For example, the AF operator 131 may be driven by a driver, such as an AF driver 133 included in the driving module 106, during focus adjustment to move along a length direction of the lens tube 101, i.e., the first direction Y. Accordingly, a relative location of the AF operator 131 with respect to another optical system may be changed and the AF operator 131 may perform a focus adjusting function with respect to a subject. However, an embodiment is not limited thereto, and any one of various structures well known to one of ordinary skill in the art may be used for an optical structure and a lens driving structure for focus adjustment, and an optical structure and a lens driving structure for zoom adjustment.

The first and second hand tremble compensating or OIS operators 151 and 152 are compensating apparatuses that may prevent or reduce image blur as the imaging device module 10 is shaken during an exposure time and are classified into digital image stabilization (DIS) type, electric image stabilization (EIS) type, and optical image stabilization (OIS) type imaging devices. Hereinafter, it is assumed that the first and second hand tremble compensating operators 151 and 152 are of an OIS type in which hand trembling of a user is compensated for by changing an optical path of light incident on the image sensor 140, and thus will be referred to as first and second OIS operators 151 and 152.

The first and second OIS operators 151 and 152 according to an embodiment may compensate for hand tremble in the first direction Y and hand tremble in a third direction X perpendicular to the first and second directions Y and Z. For example, the first OIS operator 151 may include a reflective optical system 1510 including at least one reflection surface 1511 for compensating for hand tremble in the second direction Z. Here, the first OIS operator 151 may be disposed in the lens tube 101 while being fixed to a first OIS frame 1512. Also, the first OIS operator 151 may be driven by a driver, such as a first OIS driver 155 included in the driving module 106, to move along the length direction of the lens tube 101, i.e., along the first direction Y, and accordingly, hand tremble in the first direction Y may be compensated for. Details thereof will be described later with reference to FIGS. 5A and 5B.

The second OIS operator 152 may include at least one second OIS lens 1520 to compensate for hand tremble in the third direction X. The second OIS lens 1520 may be disposed in the lens tube 101 while being fixed to a second OIS frame 1521. Here, the second OIS lens 1520 may be disposed such that movement with respect to the third direction X is not constrained, and accordingly, the second OIS lens 1520 may move along the third direction X by a driver, such as a second OIS driver 156 included in the driving module 106. Hand tremble in the third direction X may be compensated for as the second OIS lens 1520 moves along the third direction X. Here, movement of the second OIS lens 1520 with respect to the second direction Z may be constrained, and accordingly, a height of the imaging device module 10 with respect to the second direction Z may also be uniformly maintained.

The image sensor 140 receives image light and converts the image light to an electric signal. The image sensor 140 includes a photoelectric conversion device, such as a charge coupled device (CCD) or a complementary metal-oxide semiconductor (CMOS), and converts image light incident thereon through the first optical system 110, an AF module 130, and at least one of the first OIS lens 1510 and the second OIS lens 1520 into an electric signal. An electric signal obtained by the image sensor 140 is converted into image data by the controller 300.

For example, the controller 300 may convert the electric signal from the image sensor 140 into red, green, blue (RGB) data, and then convert the RGB data into raw data in a format like a YUV signal including a luminance signal and a chrominance signal. Such converting processes performed by the controller 300 may include, for example, an operation of reducing driving noise of the image sensor 140 included in an electric signal by using a correlated double sampling circuit, an operation of adjusting a gain of a signal after noise reduction by using an automatic gain control circuit, an operation of converting an analog signal to a digital signal by using an analog/digital (A/D) converter, and operations of performing signal processes on a digital signal, such as pixel defect correction, gain compensation, white balance correction, and gamma correction.

The sensor module 400 according to an embodiment is a measurer capable of measuring moving displacement of the imaging device 100 and moving displacement of the first and second OIS operators 151 and 152. For example, a 1-1st sensor 153 is a detector capable of measuring moving displacement of the imaging device 100 in the first direction Y, and a 1-2nd sensor 154 is a detector capable of measuring moving displacement of the imaging device 100 in the third direction X. The 1-1st and 1-2nd sensors 153 and 154 may include, for example, a gyro sensor, but an embodiment is not limited thereto.

Also, 2-1st and 2-2nd sensors 157 and 158 are measurers capable of measuring moving displacement of the first and second OIS operators 151 and 152. For example, the 2-1st sensor 157 is a detector capable of measuring moving displacement of the first OIS operator 151 in the first direction Y, and the 2-2nd sensor 158 is a detector capable of measuring moving displacement of the second OIS operator 152 in the third direction X. The 2-1st and 2-2nd sensors 157 and 158 may include, for example, a hall sensor, but an embodiment is not limited thereto.

The controller 300 is a controller capable of controlling operations of the imaging device module 10. For example, the controller 300 may include a random access memory (RAM), a read-only memory (ROM), a central processing unit (CPU), and a bus, wherein the RAM, the ROM, and the CPU may be connected to each other via the bus, but an embodiment is not limited thereto.

As described above, the controller 300 may realize an image by converting an electric signal of the image sensor 140 into a data signal, and in addition, may receive detection signals from the 1-1st and 1-2nd sensors 153 and 154 and the 2-1st and 2-2nd sensors 157 and 158 such that a zooming function, a focus adjusting function, and a hand trembling compensation function are preformed, and control movement of the zoom lens module 120, the AF module 130, the first OIS operator 151, and the second OIS operator 152 by transmitting a control signal to a respective driver.

FIGS. 5A through 5D are schematic diagrams illustrating the imaging device module 10 according to an example embodiment. FIG. 6A is a graph illustrating example moving displacement of the AF operator 131 and the first OIS operator 151, according to an example embodiment. FIG. 6B is a graph illustrating example moving displacement of the AF operator 131 according to an example embodiment.

Figure 5A:
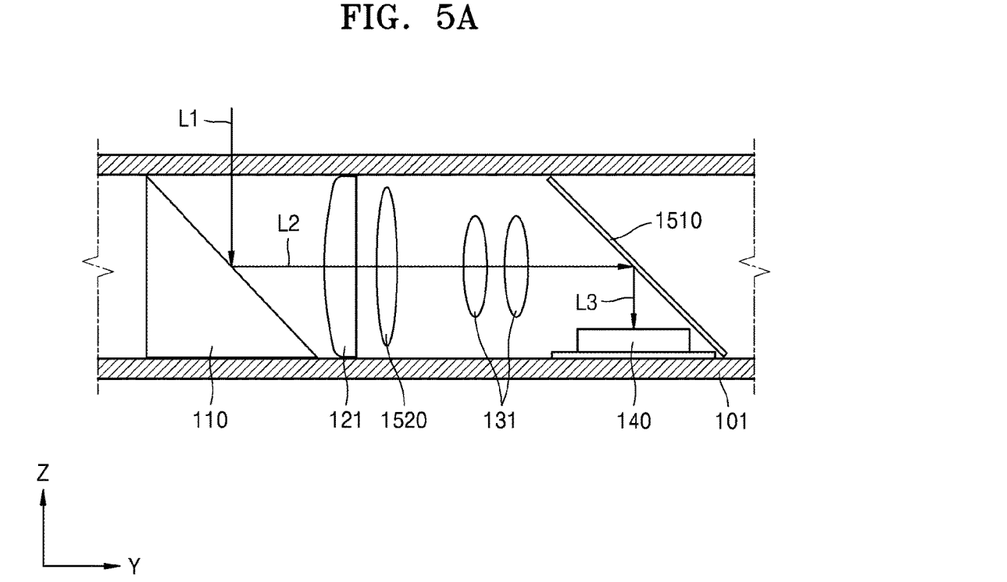
FIGS. 5A through 5D are schematic diagrams illustrating an example imaging device module according to an example embodiment.
Figure 5B:
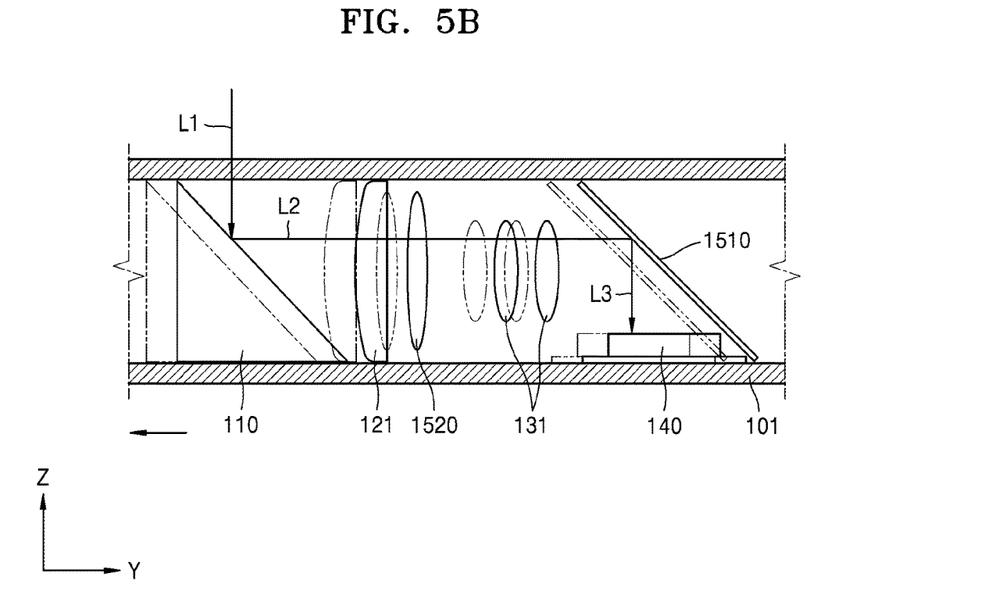

Referring to FIGS. 2 and 5A through 5D, when the user trembles his/her hand, the 1-1st sensor 153 may detect moving displacement of the imaging device 100 in the first direction Y, and the 1-2nd sensor 154 may detect moving displacement of the imaging device 100 in the third direction X. For example, as illustrated in FIGS. 5A and 5B, the second light L2 reflected from the first optical system 110 may be reflected at the reflective optical system 1510 included in the first OIS operator 151, and third light L3 reflected by the reflective optical system 1510 may be incident on the image sensor 140. Here, the imaging device 100 may move along the first direction Y as the user trembles his/her hand, and accordingly, a location of the third light L3 incident on the image sensor 140 may be changed.

Figure 5C:
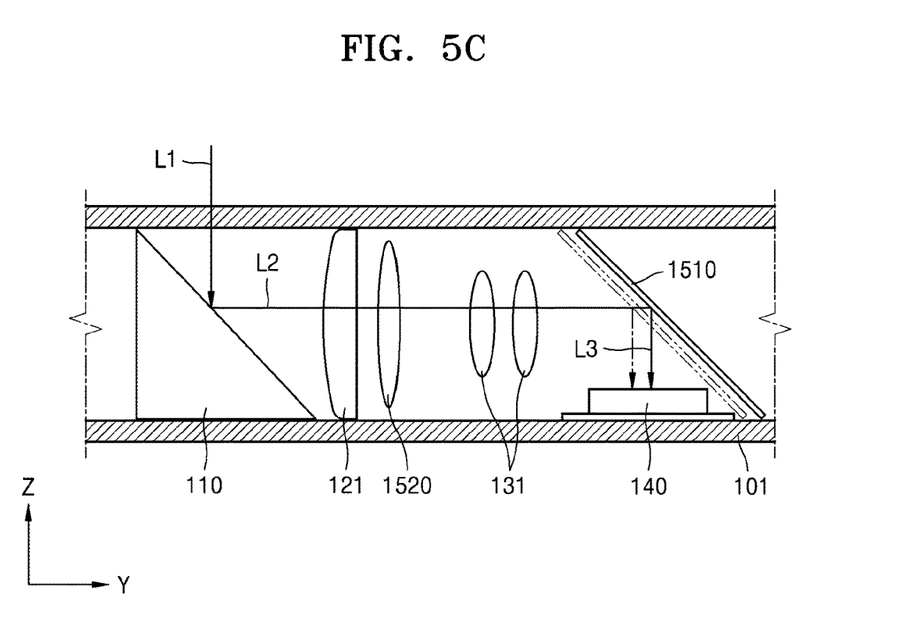
Figure 6A:
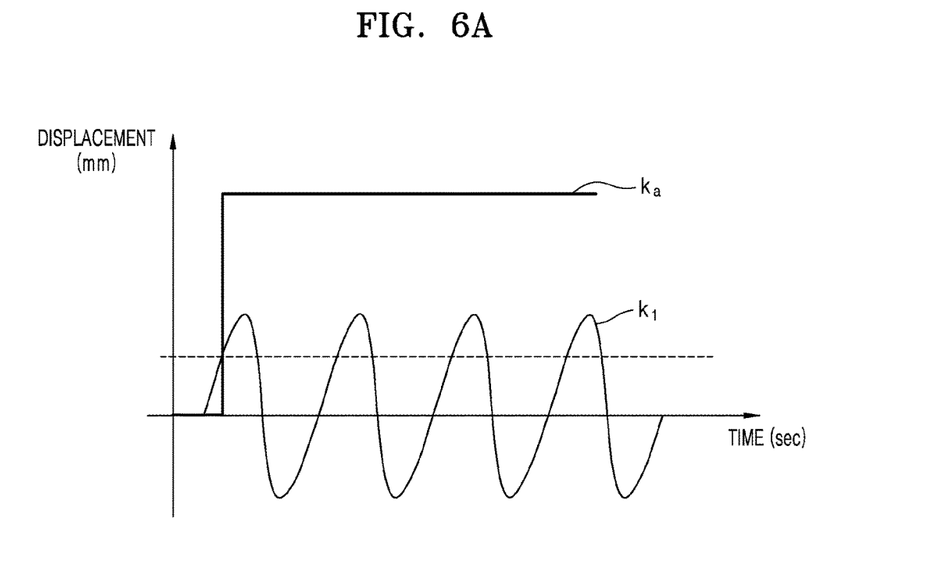
FIG. 6A is a graph illustrating an example moving displacement of an auto-focus (AF) operator and a first optical image stabilization (OIS) operator, according to an example embodiment.
Figure 6B:
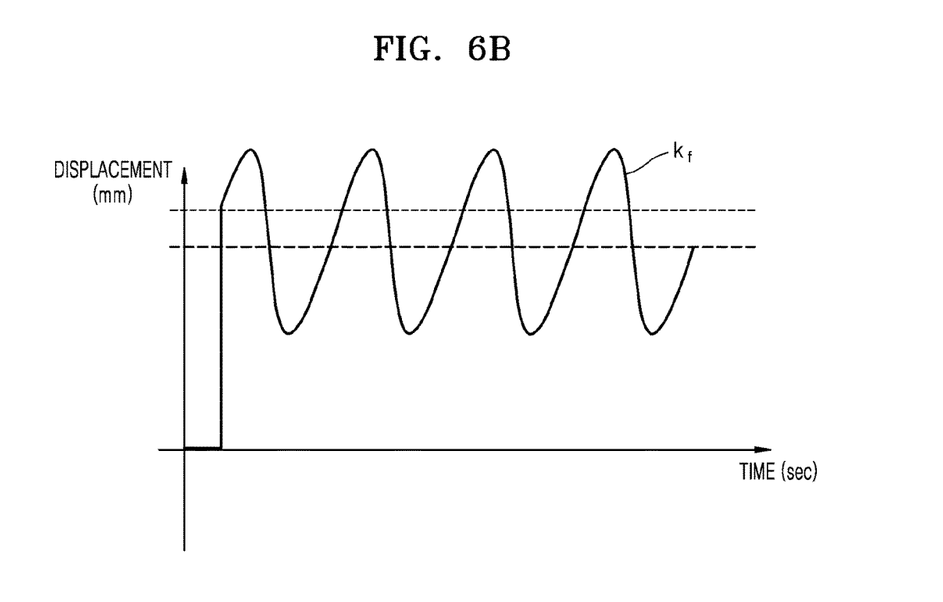
FIG. 6B is a graph illustrating an example moving displacement of an AF operator according to an example embodiment.

By using the moving displacement of the imaging device 100 detected by the 1-1st and 1-2nd sensors 153 and 154, the controller 300 may generate driving signals for the first and second OIS drivers 155 and 156. Here, the first and second OIS drivers 155 and 156 may move the reflective optical system 1510 or the second OIS lens 1520 by transmitting driving power to an OIS optical system, such as the reflective optical system 1510 or the second OIS lens 1520, according to the driving signals received from the controller 300. For example, as shown in FIG. 5C, the reflective optical system 1510 may move along the first direction Y by the first OIS driver 155, and accordingly, the location of the third light L3 incident on the image sensor 140 may be compensated for.

As described above, when hand trembling compensation is performed by moving the reflective optical system 1510 or the second OIS lens 1520 along the first direction Y and the third direction X by using the first and second OIS drivers 155 and 156, the 2-1st and 2-2nd sensors 157 and 158 may measure moving displacement of the OIS optical system, for example, the reflective optical system 1510 or the second OIS lens 1520, by the first and second OIS drivers 155 and 156. The controller 300 may compare the moving displacement of the imaging device 100 detected by the 1-1st and 1-2nd sensors 153 and 154 and the moving displacement of the reflective optical system 1510 or the second OIS lens 1520 detected by the 2-1st and 2-2nd sensors 157 and 158 to transmit the driving signals to the first and second OIS drivers 155 and 156, and accordingly, trembling of an image formed on the image sensor 140 may be compensated for in real-time.

While the hand trembling compensation is performed by the first and second OIS operators 151 and 152, the AF module 130 may automatically adjust a focus of the subject by moving the at least one AF operator 131 in the first direction Y. For example, when an AF function on the subject is activated, the controller 300 may generate a driving signal for the AF driver 133, and the AF driver 133 may move the AF operator 131 along the first direction Y according to the driving signal received from the controller 300.

Figure 5D:
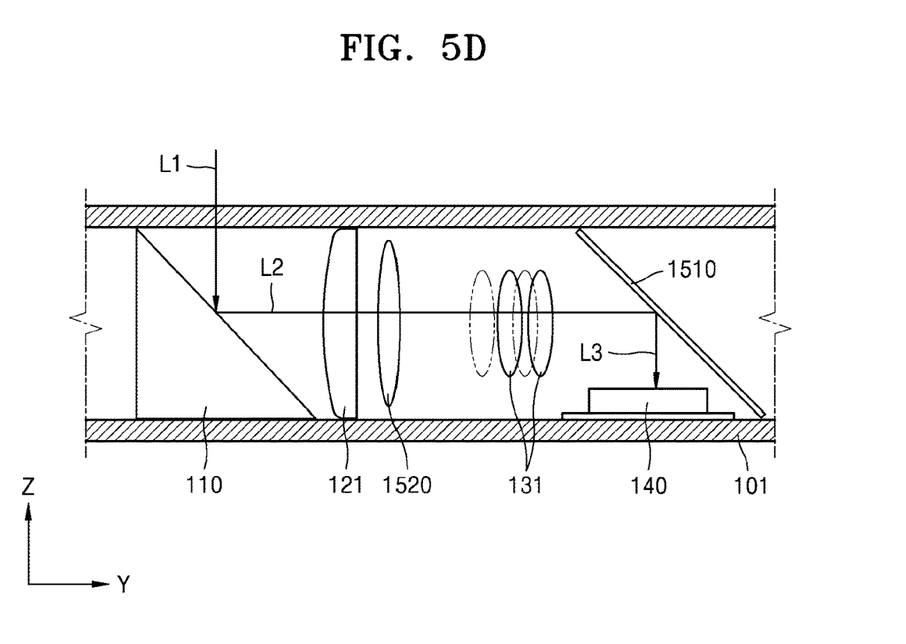

When the hand trembling compensation and the AF function are simultaneously performed, a focal length with respect to the first direction Y may continuously change. For example, when the hand trembling compensation is performed with respect to the first direction Y by the first OIS operator 151, the first OIS operator 151 may move along the first direction Y and the AF operator 131 included in the AF module 130 may also move along the first direction Y. Here, during the hand trembling compensation, a focal length of the AF operator 131 with respect to the subject may continuously change as the first OIS operator 151 moves. Here, the controller 300 may calculate final moving displacement $K_f$ of the AF operator 131 as shown in FIG. 6B by adding moving displacement $K_1$ of the first OIS operator 151 in the first direction Y and moving displacement $K_a$ of the AF operator 131 for focus adjustment on the subject shown in FIG. 6A. Also, the controller 300 may determine a new driving signal for the AF driver 133 according to the final moving displacement $K_f$ of the AF operator 131, and the AF operator 131 may move as shown in FIG. 5D according to the new driving signal. When the AF operator 131 moves according to the new driving signal, a phenomenon in which a focus on the subject is changed may be prevented and at the same time, the hand trembling compensation may be performed.

Figure 7:
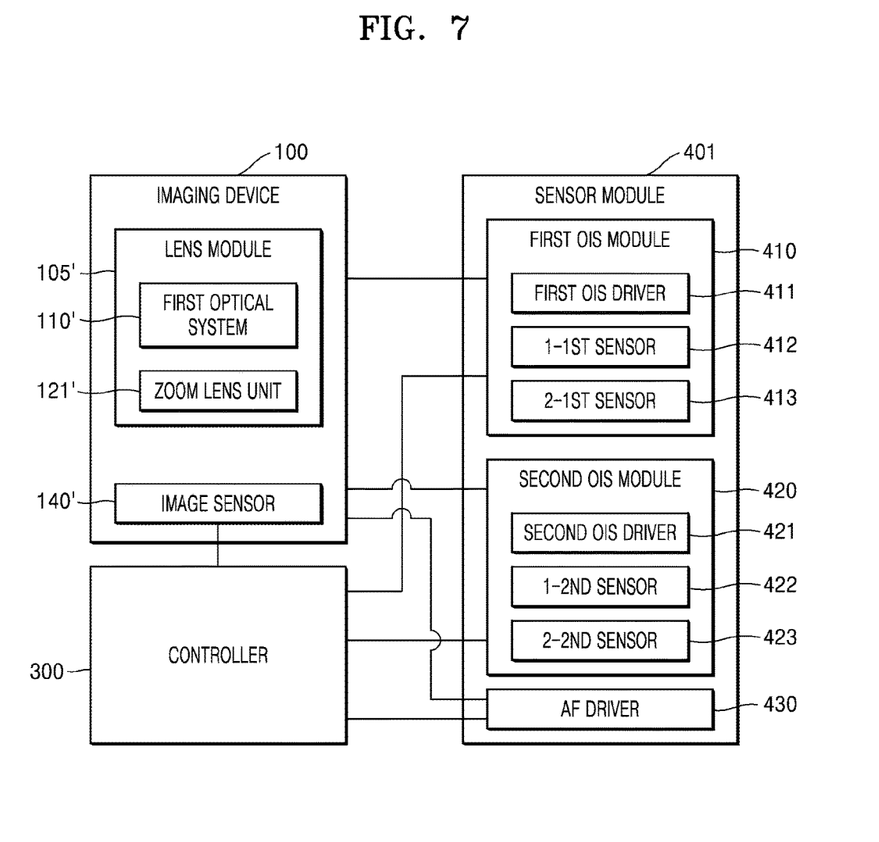
FIG. 7 is a block diagram illustrating an example structure of an imaging device module, according to another example embodiment.
Figure 8:
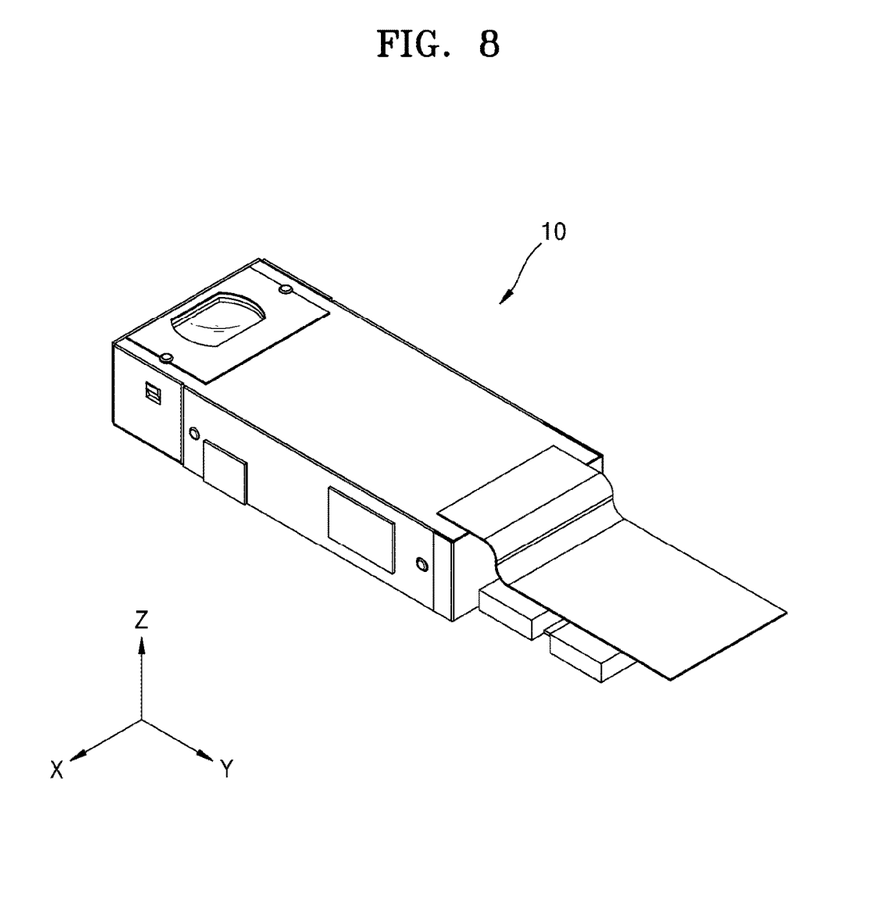
FIG. 8 is a perspective view of an example imaging device module according to another example embodiment.
Figure 9:
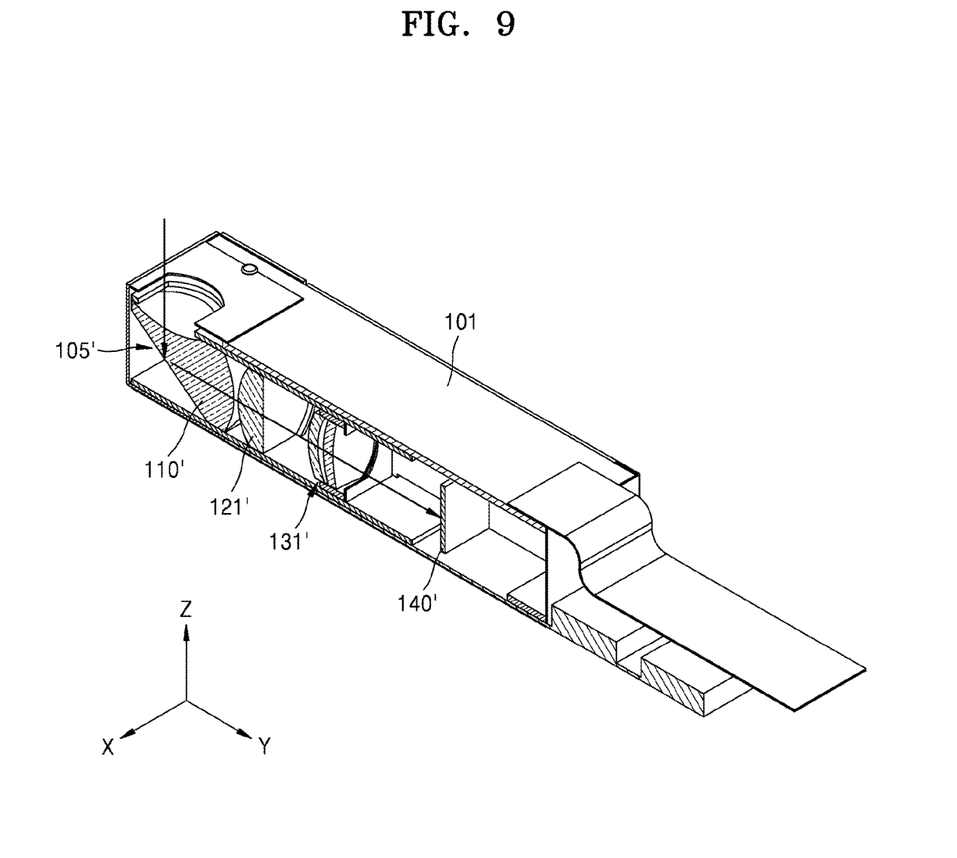
FIG. 9 is a cross-sectional view of an example imaging device module according to another example embodiment.

FIG. 7 is a block diagram illustrating an example structure of the imaging device module 10, according to another example embodiment. FIG. 8 is a perspective view of the imaging device module 10 according to another example embodiment. FIG. 9 is a cross-sectional view of the imaging device module 10 according to another example embodiment.

Referring to FIGS. 7 through 9, the imaging device module 10 according to another embodiment may include the imaging device 100 including a lens module 105' through which incident light penetrates and an image sensor 140' receiving the incident light that penetrated through the lens module 105', the controller 300 for controlling operations of the imaging device module 10, and a driving module 401 for transmitting driving power to the lens module 105'.

The lens module 105' according to an embodiment may include the lens tube 101 extending along the first direction Y, a first optical system 110' for changing an optical path of the first light L1 incident from an external source, a zoom lens unit 121' that is a lens unit including one or more lenses arranged along the first direction Y, and an AF operator 131' for automatically adjusting a focus on the subject. Since details about the first optical system 110', the zoom lens unit 121', and the AF operator 131' are the same as those described above, descriptions thereof are not provided again.

The image sensor 140' is an imaging device that receives image light incident on the lens module 105' and converts the image light into an electric signal. According to an embodiment, the image sensor 140' may be disposed to face the lens module 105' in the first direction Y, but an embodiment is not limited thereto. Also, the lens module 105' may be provided to move along the second direction Z, the first direction Y, and the third direction X with respect to the image sensor 140', by receiving driving power from the driving module 401 described later. Since details about the image sensor 140' are the same as those described above, descriptions thereof are not provided again.

The controller 300 is a controller capable of controlling operations of the lens module 105', the image sensor 140', and the driving module 401. Since details about the controller 300 are the same as those described above, descriptions thereof are not provided again.

The driving module 401 is a driver capable of generating driving power for moving the lens module 105'. For example, the driving module 401 may include a first OIS module 410 for moving the lens module 105' along the second direction Z, a second OIS module 420 for moving the lens module 105' along the third direction X, and an AF driver 430 for moving the lens module 105' along the first direction Y.

The first OIS module 410 is an optical path compensating apparatus for compensating for hand trembling in the second direction Z. According to an embodiment, the first OIS module 410 may include a first OIS driver 411, a 1-1st sensor 412, and a 2-1st sensor 413. The first OIS driver 411 according to an embodiment is a driver for moving the lens module 105' along the second direction Z. The lens module 105' may move along the second direction Z by the first OIS driver 411, and accordingly, a relative location of the image sensor 140' with respect to the lens module 105' in the second direction Z may change. For example, the first OIS driver 411 may be a stepping motor or a piezo-motor, but an embodiment is not limited thereto.

The 1-1st sensor 412 is a measurer capable of measuring moving displacement and moving direction of the imaging device 100 according to hand tremble. For example, the 1-1st sensor 412 is a detector capable of measuring moving displacement of the imaging device 100 in the first direction Y and may be a gyro sensor, but an embodiment is not limited thereto. The 2-1st sensor 413 is a measurer capable of measuring moving displacement of the lens module 105' by the first OIS driver 411. For example, the 2-1st sensor 413 is a measurer capable of measuring moving displacement of the lens module 105' in the second direction Z. For example, the 2-1st sensor 413 may be a hall sensor, but an embodiment is not limited thereto.

The second OIS module 420 is an optical path compensating apparatus for compensating for hand trembling in the third direction X. According to an embodiment, the second OIS module 420 may include a second OIS driver 421 for moving the lens module 105' in the third direction X, a 1-2nd sensor 422 for measuring moving displacement of the imaging device 100 in the third direction X, and a 2-2nd sensor 423 for measuring moving displacement of the lens module 105' in the third direction X. Since details of the second OIS module 421, the 1-2nd sensor 422, and the 2-2nd sensor 423 are the same as those described above with reference to the first OIS module 410, descriptions thereof are not provided again.

The AF driver 430 is a driver for adjusting a focus on the subject. According to an embodiment, the AF driver 430 may move the lens module 105' along the first direction Y, and accordingly, a relative location of the lens module 105' and the image sensor 140' may change with respect to the first direction Y. For example, the AF driver 430 may be a stepping motor or a piezo-motor, but an embodiment is not limited thereto.

FIGS. 10A through 10D are schematic views of the imaging device module 10 according to another embodiment.

Figure 10A:
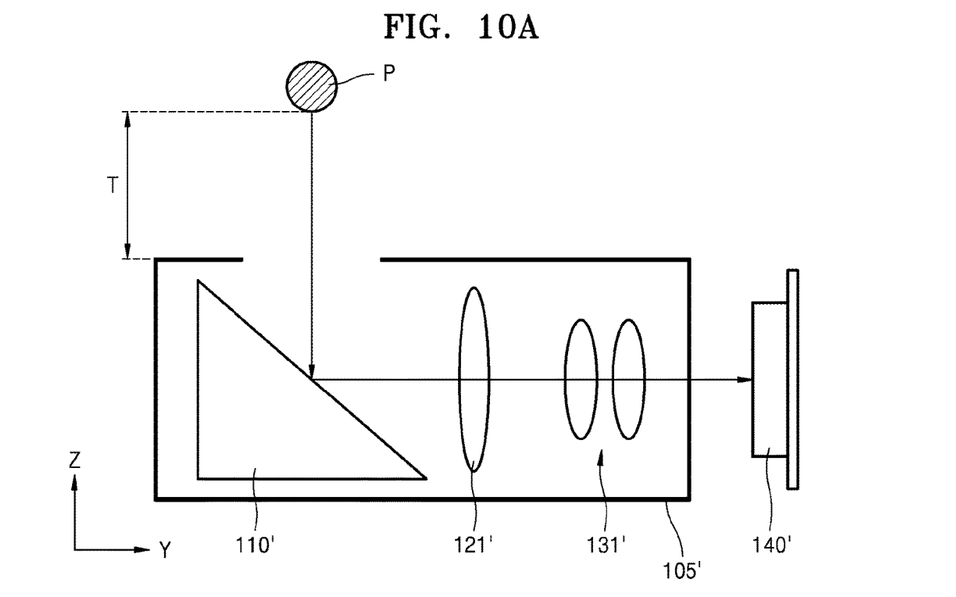
FIGS. 10A through 10D are schematic diagrams illustrating an example imaging device module according to another example embodiment.
Figure 10B:
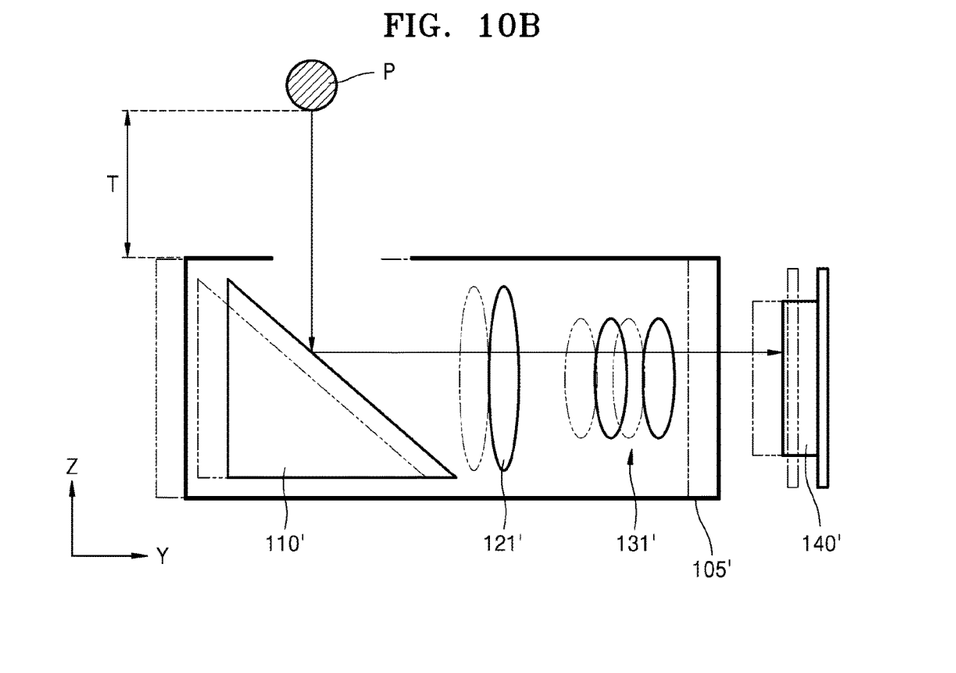

Referring to FIGS. 7 and 10A through 10D, when the user trembles his/her hand, the 1-1st sensor 412 may detect moving displacement of the imaging device 100 in the first direction Y, and the 1-2nd sensor 422 may detect moving displacement of the imaging device 100 in the third direction X. According to an embodiment, the imaging device 100 may move along the second direction Z as shown in FIGS. 10A and 10B as the user trembles his/her hand. Here, a distance T between a subject P and the lens module 105' may be reduced to a distance $T_1$ before hand trembling compensation between the subject P and the lens module 105', and a location of light incident on the image sensor 140' may also change.

Figure 10C:
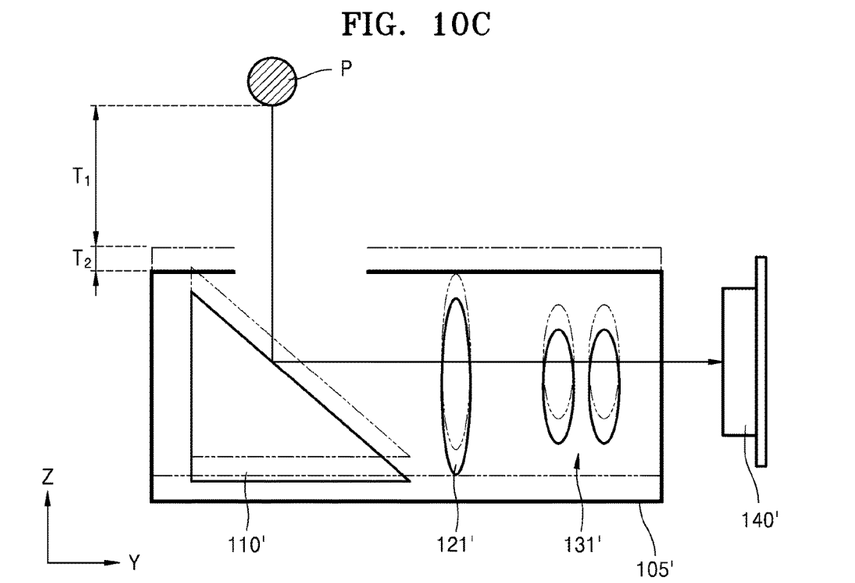

The controller 300 may generate driving signals for the first and second OIS drivers 411 and 421 by using the moving displacement of the imaging device 100 detected by the 1-1st and 1-2nd sensors 412 and 422. Here, the first and second OIS drivers 411 and 412 may move the lens module 105' along the second direction Z and the third direction X by transmitting driving power to the lens module 105' according to the driving signals received from the controller 300. For example, as shown in FIG. 10C, the lens module 105' may move by moving displacement $T_2$ along the second direction Z by the first OIS driver 411, and accordingly, the distance T between the subject P and the lens module 105' may be increased by the moving displacement $T_2$ than the distance $T_1$ before hand trembling compensation between the subject P and the lens module 105', and the location of the light incident on the image sensor 140' may also be adjusted.

As described above, when hand trembling compensation is performed by moving the lens module 105' along the second direction Z and the third direction X by using the first and second OIS drivers 411 and 421, the 2-1st and 2-2nd sensors may measure moving displacement of the lens module 105' with respect to the second direction Z and the third direction X, and the controller 300 may compare the moving displacement of the imaging device 100 detected by the 1-1st and 1-2nd sensors 412 and 422 and the moving displacement of the lens module 105' detected by the 2-1st and 2-2nd sensors 413 and 423 to transmit the driving signals to the first and second OIS drivers 411 and 421, and accordingly, trembling of an image formed on the image sensor 140' may be compensated for in real-time.

While the hand trembling compensation is performed by the first and second OIS modules 410 and 420, the AF driver 430 may move the lens module 105' along the first direction Y to adjust a focus on the subject P. For example, when an AF function on the subject P is activated, the controller 300 may generate a driving signal for the AF driver 430, and the AF driver 430 may move the lens module 105' along the first direction Y according to the driving signal received from the controller 300.

When the hand trembling compensation and the AF function are simultaneously performed, the distance T between the subject P and the lens module 105' may continuously change. For example, when the hand trembling compensation is performed by the first OIS module 410 with respect to the second direction Z, the lens module 105' may move along the second direction Z in real-time, and accordingly, the distance T between the subject P and the lens module 105' may continuously change. The AF driver 430 may adjust a focus on the subject P by moving the lens module 105' in the first direction Y according to the distance T between the subject P and the lens module 105', but since the lens module 105' moves along the second direction Z by the first OIS module 410 during the hand trembling compensation, the distance T between the subject P and the lens module 105' changes in real-time, and thus the focus on the subject P may also change in real-time.

Figure 10D:
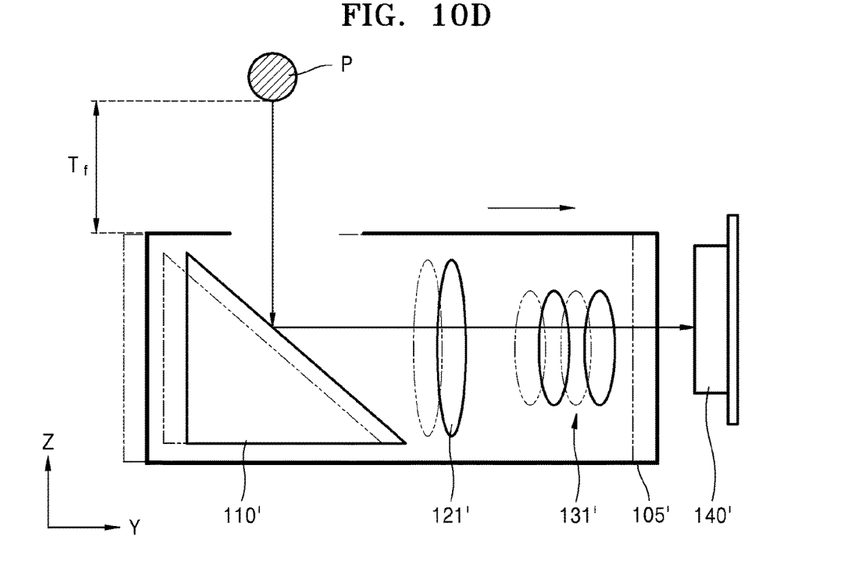

The controller 300 may determine a final distance $T_f$ between the subject P and the lens module 105' by adding the distance $T_1$ before hand trembling compensation between the subject P and the lens module 105' and the moving displacement $T_2$ of the lens module 105' in the second direction Z by the first OIS module 410, and a new driving single of the AF driver 430 may be determined based on the final distance $T_f$. For example, as shown in FIG. 10D, the controller 300 may determine the new driving signal of the AF driver 430 according to the final distance $T_f$ obtained by adding the distance $T_1$ and the moving displacement $T_2$, and the lens module 105' may move along the first direction Y according to the new driving signal of the AF driver 430, and thus changing of a focus on the subject P may be prevented while the hand trembling compensation is performed.

According to one or more example embodiments, an imaging device module having an AF function and a hand trembling compensation function and mountable on a slim user terminal apparatus, a user terminal apparatus including the imaging device module, and a method of operating the imaging device module are provided.

It should be understood that the various example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. An imaging device module comprising:
    an imaging device for obtaining an image of a subject, the imaging device comprising:
        a first optical element on which first light is incident;
        a first optical image stabilizer (OIS) movable back and forth along a first direction, wherein the first direction is a direction of an optical axis of second light reflected from the first optical element;
        a first OIS driver configured to move the first OIS along the first direction; and
        an image sensor on which third light reflected from the first OIS is incident.

2. The imaging device module of claim 1, further comprising:
    a first sensor configured to measure moving displacement of the imaging device in the first direction; and
    a second sensor configured to measure moving displacement of the first OIS.

3. The imaging device module of claim 2, wherein the imaging device further comprises:
    a second OIS movable back and forth along a third direction, wherein a second direction is an optical axis direction of the first light and the third direction is perpendicular to the first direction and the second direction; and
    a second OIS driver configured to move the second OIS along the third direction.

4. The imaging device module of claim 3, further comprising:
    a third sensor configured to measure moving displacement of the imaging device in the third direction; and
    a fourth sensor configured to measure moving displacement of the second OIS.

5. The imaging device module of claim 4, wherein the imaging device further comprises:
    an auto-focus (AF) element movable back and forth along the first direction; and
    an AF driver configured to move the AF element along the first direction.

6. The imaging device module of claim 5, further comprising:
    a controller configured to control the first and second OIS drivers and the AF driver.

7. The imaging device module of claim 1, wherein at least one of the first optical element and the first OIS comprises a reflection surface.

8. A method of operating the imaging device module of claim 1, the method comprising:
    measuring moving displacement of the imaging device in the first direction resulting at least in part from hand tremble; and
    moving the first OIS back and forth along the first direction based on the measured moving displacement of the imaging device in the first direction.

9. The method of claim 8, further comprising:
    moving an auto-focus (AF) element back and forth along the first direction.

10. The method of claim 9, wherein moving displacement of the AF element is determined by adding the moving displacements of the first OIS in the first direction.

11. The method of claim 8, further comprising:
    measuring moving displacement of the imaging device in the third direction resulting at least in part from hand tremble; and
    moving the second OIS back and forth along the third direction based on the measured moving displacement of the imaging device in the third direction.

* * * * *